(12) United States Patent
Nellich et al.

(10) Patent No.: US 12,106,148 B2
(45) Date of Patent: Oct. 1, 2024

(54) METHOD AND SYSTEM FOR SCHEDULING ACCESS TO A NODE CLASS OF A SHARED RESOURCE

(71) Applicant: The Toronto-Dominion Bank, Toronto (CA)

(72) Inventors: Danielle Jacqueline Nellich, Toronto (CA); Lydia Grace Cervini, Mississauga (CA); Antonio Katipunan Marasigan, Mississauga (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 17/946,303

(22) Filed: Sep. 16, 2022

(65) Prior Publication Data

US 2024/0095071 A1     Mar. 21, 2024

(51) Int. Cl.
*G06F 15/173*     (2006.01)
*G06F 9/50*       (2006.01)
*H04L 67/62*      (2022.01)

(52) U.S. Cl.
CPC .......... *G06F 9/5005* (2013.01); *H04L 67/62* (2022.05)

(58) Field of Classification Search
CPC ......... H04L 67/60; H04L 67/61; H04L 67/62; G06F 9/50; G06F 9/5005; G06F 9/5011; G06F 9/5016; G06F 9/5022; G06F 9/5027; G06F 9/5033; G06F 9/5038; G06F 9/5044; G06F 9/505
See application file for complete search history.

(56) References Cited

U.S. PATENT DOCUMENTS

| | | | |
|---|---|---|---|
| 8,503,380 B2 * | 8/2013 | Meyer | H04L 1/1854 |
| | | | 455/450 |
| 9,760,928 B1 * | 9/2017 | Ward, Jr. | G06Q 30/0619 |
| 10,949,833 B2 | 3/2021 | Isaacson et al. | |
| 11,366,652 B1 * | 6/2022 | Pressacco | G06F 9/5072 |
| 2006/0241983 A1 | 10/2006 | Viale et al. | |
| 2012/0078701 A1 | 3/2012 | Woods | |
| 2012/0089641 A1 | 4/2012 | Wilde et al. | |
| 2012/0159499 A1 * | 6/2012 | Shafiee | G06F 9/5011 |
| | | | 718/103 |
| 2014/0057592 A1 * | 2/2014 | Chetlur | H04L 41/5064 |
| | | | 455/414.1 |
| 2016/0226788 A1 * | 8/2016 | Chittigala | G06F 11/203 |
| 2018/0060760 A1 * | 3/2018 | Permeh | G06N 20/00 |
| 2019/0215804 A1 * | 7/2019 | Wan | G06F 9/45558 |
| 2020/0351374 A1 | 11/2020 | Eberle et al. | |
| 2021/0264457 A1 | 8/2021 | Booska et al. | |
| 2021/0279823 A1 | 9/2021 | Reis et al. | |
| 2022/0019475 A1 * | 1/2022 | Dobson | G06F 9/5044 |
| 2022/0156124 A1 * | 5/2022 | Nandavanam | G06F 9/5027 |

\* cited by examiner

*Primary Examiner* — Joseph R Maniwang
(74) *Attorney, Agent, or Firm* — Rowand LLP (57) ABSTRACT

A computer server system comprises a communications module; a processor coupled with the communications module; and a memory coupled to the processor and storing processor-executable instructions which, when executed by the processor, configure the processor to obtain an indication of scheduled access to a first node class of a shared resource; determine that a second node class of the shared resource is available; and schedule access to the second node class of the shared resource in place of the scheduled access to the first node class of the shared resource.

20 Claims, 4 Drawing Sheets

500

Obtain an indication of scheduled access to a first node class of a shared resource

510

Determine that a second node class of the shared resource is available

520

Schedule access to the second node class of the shared resource in place of the scheduled access to the first node class of the shared resource

METHOD AND SYSTEM FOR SCHEDULING ACCESS TO A NODE CLASS OF A SHARED RESOURCE

TECHNICAL FIELD

The present application relates to methods and systems for scheduling access to a node class of a shared resource.

BACKGROUND

Shared resources often have nodes that may be accessed by a requesting party. The nodes may be divided into different node classes. It may be difficult to schedule or otherwise provide access to one of the node classes of the shared resource as the node class may have limited bandwidth availability.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Accordingly, in one aspect there is provided a computer server system comprising a communications module; a processor coupled with the communications module; and a memory coupled to the processor and storing processor-executable instructions which, when executed by the processor, configure the processor to obtain an indication of scheduled access to a first node class of a shared resource; determine that a second node class of the shared resource is available; and schedule access to the second node class of the shared resource in place of the scheduled access to the first node class of the shared resource.

In one or more embodiments, the scheduled access to the first node class identifies a time window and determining that the second node class is available includes determining that a node within the second node class is available within the time window.

In one or more embodiments, the processor-executable instructions, when executed by the processor, further configure the processor to determine that a current time has reached the time window; and provide access to the node within the second node class.

In one or more embodiments, when scheduling access to the second node class, the processor-executable instructions, when executed by the processor, further configure the processor to send, via the communications module and to a third-party server associated with a provider of the shared resource, a request to schedule the access to the second node class.

In one or more embodiments, the request to schedule the access to the second node class is sent to the third-party server without notifying a requesting party that scheduled the access to the first node class of the shared resource.

In one or more embodiments, the request to schedule the access to the second node class includes a binary flag indicating that the second node class is to be scheduled in place of the first node class.

In one or more embodiments, when scheduling access to the second node class, the processor-executable instructions, when executed by the processor, further configure the processor to engage an application programming interface associated with a provider of the shared resource to schedule the access to the second node class.

In one or more embodiments, when determining that the second node class of the shared resource is available, the processor-executable instructions, when executed by the processor, further configure the processor to identify, based on a load projection for the shared resource, that the second node class of the shared resource is available.

In one or more embodiments, the processor-executable instructions, when executed by the processor, further configure the processor to consult a database to determine that the second node class is to be scheduled in place of the first node class.

In one or more embodiments, the second node class is an upgrade from the first node class.

According to another aspect there is provided a computer-implemented method comprising obtaining an indication of scheduled access to a first node class of a shared resource; determining that a second node class of the shared resource is available; and scheduling access to the second node class of the shared resource in place of the scheduled access to the first node class of the shared resource.

In one or more embodiments, the scheduled access to the first node class identifies a time window and determining that the second node class is available includes determining that a node within the second node class is available within the time window.

In one or more embodiments, the method further comprises determining that a current time has reached the time window; and providing access to the node within the second node class.

In one or more embodiments, when scheduling access to the second node class, the method further comprises sending, via a communications module and to a third-party server associated with a provider of the shared resource, a request to schedule the access to the second node class.

In one or more embodiments, the request to schedule the access to the second node class is sent to the third-party server without notifying a requesting party that scheduled the access to the first node class of the shared resource.

In one or more embodiments, the request to schedule the access to the second node class includes a binary flag indicating that the second node class is to be scheduled in place of the first node class.

In one or more embodiments, when scheduling access to the second node class, the method further comprises engaging an application programming interface associated with a provider of the shared resource to schedule the access to the second node class.

In one or more embodiments, when determining that the second node class of the shared resource is available, the method further comprises identifying, based on a load projection for the shared resource, that the second node class of the shared resource is available.

In one or more embodiments, the second node class is an upgrade from the first node class.

According to another aspect there is provided a non-transitory computer readable storage medium comprising computer-executable instructions which, when executed, configure a processor to obtain an indication of scheduled access to a first node class of a shared resource; determine that a second node class of the shared resource is available; and schedule access to the second node class of the shared resource in place of the scheduled access to the first node class of the shared resource.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Figure 1:
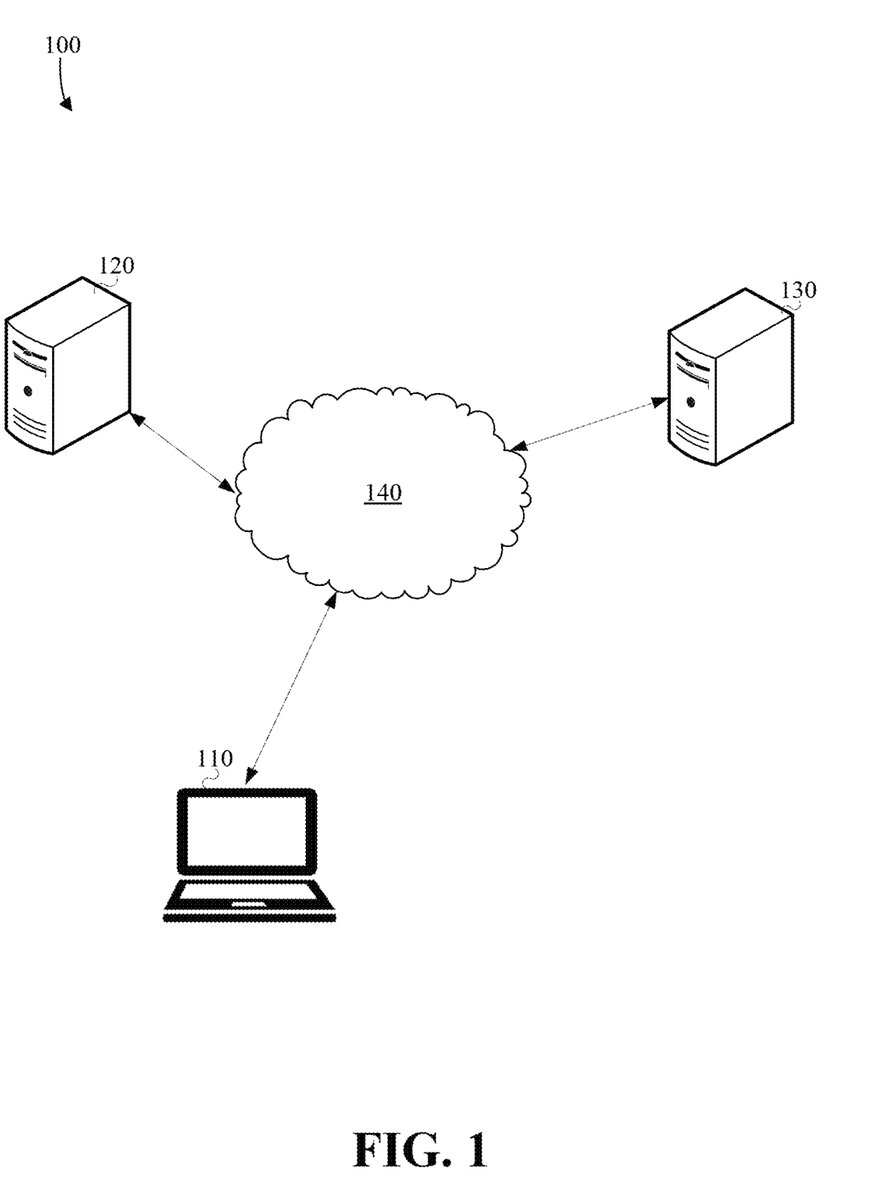
FIG. 1 is a schematic operation diagram illustrating an operating environment of an example embodiment.

FIG. 1 is a block diagram illustrating an operating environment of an example embodiment. Various components cooperate to provide a system 100 which may be used, for example, to provide access to a node of a shared resource. As shown, the system 100 includes a requesting device 110, a first server computer system 120 and a second server computer system 130 coupled to one another through a network 140.

The requesting device 110 is configured to communicate with the first server computer system 120 via the network 150 and vice-versa. The requesting device 110 may be remote from the first server computer system 120.

The first server computer system 120 is configured to communicate with the second server computer system 130 via the network 150 and vice-versa. The first server computer system 120 may be remote from the second server computer system 130.

The requesting device 110 may be a laptop computer as shown in FIG. 1. However, the requesting device 110 may be a computing device of another type such as for example a mobile device, a personal computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The first server computer system 120 may maintain one or more databases that may store indications of scheduled access to a node class of a shared resource. As will be described in more detail below, the first server computer system 120 may be configured to schedule access to a different node class of the shared resource in place of the scheduled access to the node class of the shared resource. The one or more databases may additionally store data that may be consulted or analyzed to determine whether or not a different node class is to be scheduled. The data may include, for example, customer data or transaction data. Other types of data may be stored in the database such as for example travel data that includes travel dates, hotel names, addresses, flight information, restaurant reservations, etc.

The second server computer system 130 may be associated with a provider of a shared resource. The second server computer system 130 may be maintained by a third-party that does not maintain the first server computer system 120. The second server computer system 130 may provide access to a node of a particular node class of the shared resource. The node classes may be hierarchical such that a second node class is an upgrade from a first node class.

The first server computer system 120 may communicate with the second server computer system 130 to schedule access to a node class of a shared resource provided by the second server computer system 130. In one or more embodiments, the first server computer system 120 may communicate directly with the second server computer system 130 via the network 140. In one or more other embodiments, the first server computer system 120 may engage an application programming interface (API) that may be used to communicate with the second server computer system 130.

The first server computer system 120 and the second server computer system 130 are computer systems. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, compute servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The network 140 is a computer network. The network 140 may include a public network such as the Internet and/or a private network. In some embodiments, the network 140 may be an internetwork such as may be formed of one or more interconnected computer networks. For example, the network 140 may be or may include an Ethernet network, a wireless network, a telecommunications network, or the like.

FIG. 1 illustrates an example representation of components of the system 100. The system 100 can, however, be implemented differently than the example of FIG. 1. For example, various components that are illustrated as separate systems in FIG. 1 may be implemented on a common system. By way of further example, the functions of a single component may be divided into multiple components.

Figure 2:
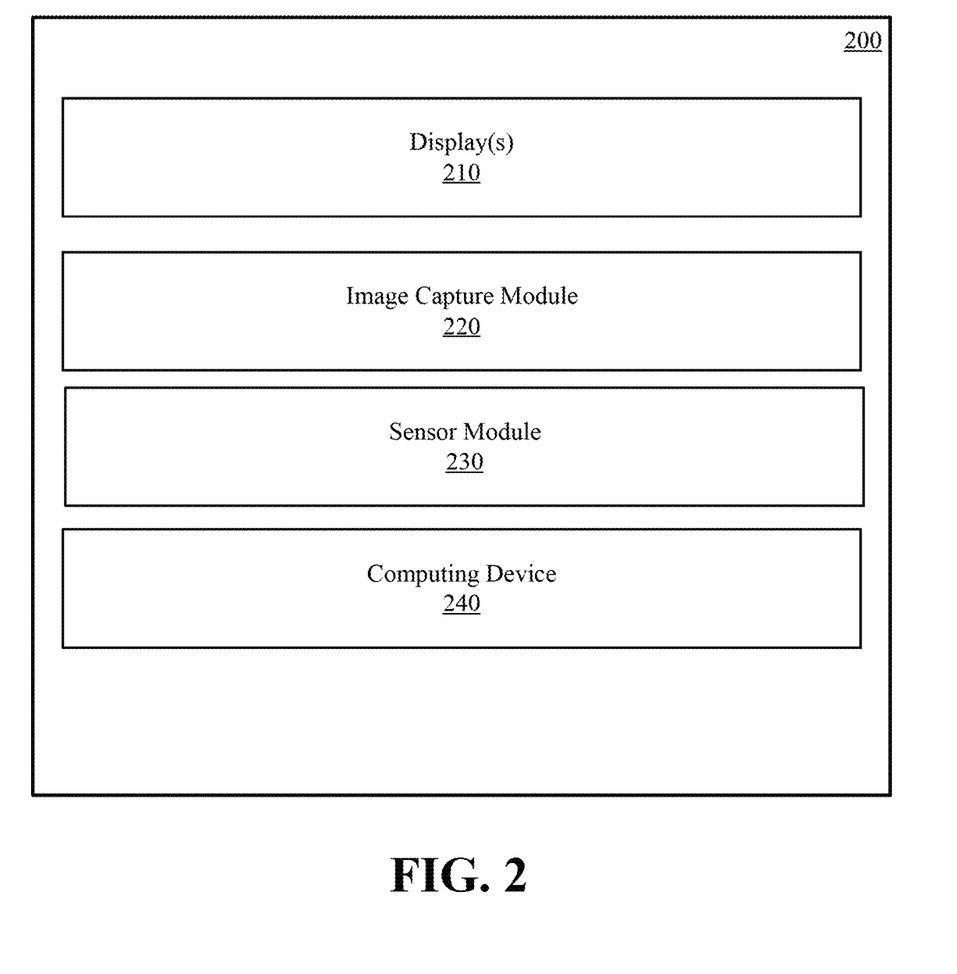
FIG. 2 is a simplified schematic diagram showing components of a computing device.

FIG. 2 is a simplified schematic diagram showing components of an exemplary computing device 200. The requesting device 110 may be of the same type as computing device 200. The computing device 200 may include modules including, as illustrated, for example, one or more displays 210, an image capture module 220, a sensor module 230, and a computer device 240.

The one or more displays 210 are a display module. The one or more displays 210 are used to display screens of a graphical user interface that may be used, for example, to communicate with the first server computer system 120

(FIG. 1). The one or more displays 210 may be internal displays of the computing device 200 (e.g., disposed within a body of the computing device).

The image capture module 220 may be or may include a camera. The image capture module 220 may be used to obtain image data, such as images. The image capture module 220 may be or may include a digital image sensor system as, for example, a charge coupled device (CCD) or a complementary metal-oxide-semiconductor (CMOS) image sensor.

The sensor module 230 may be a sensor that generates sensor data based on a sensed condition. By way of example, the sensor module 230 may be or include a location subsystem which generates location data indicating a location of the computing device 200. The location may be the current geographic location of the computing device 200. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computer device 240 is in communication with the one or more displays 210, the image capture module 220, and the sensor module 230. The computer device 240 may be or may include a processor which is coupled to the one or more displays 210, the image capture module 220, and/or the sensor module 230.

Figure 3:
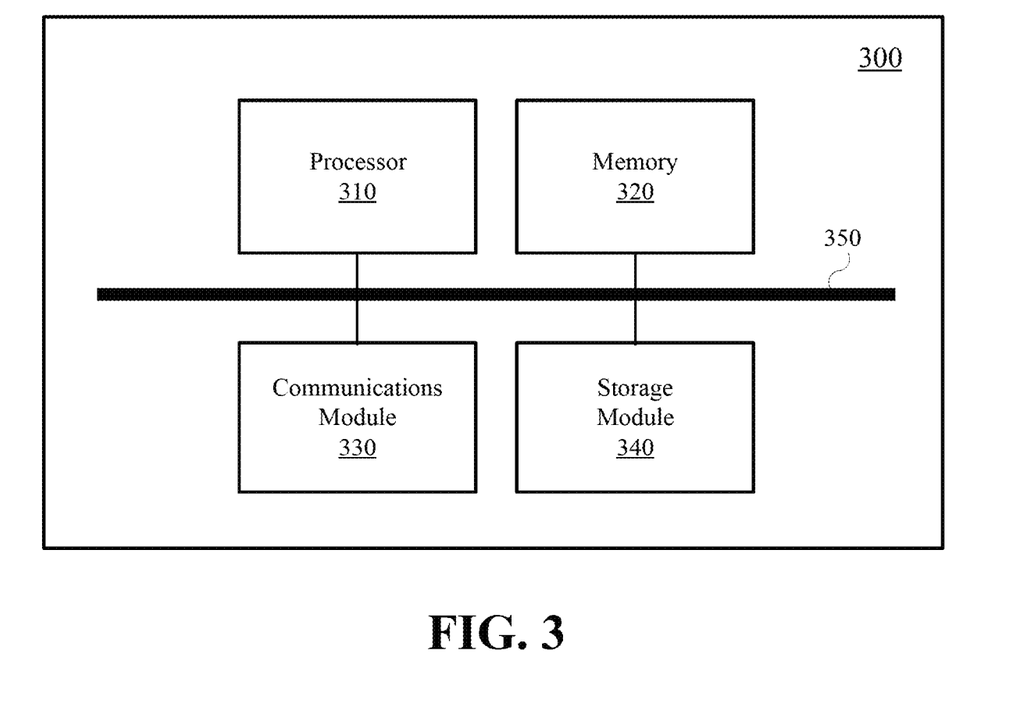
FIG. 3 is a high-level schematic diagram of an example computer device.

Referring now to FIG. 3, a high-level operation diagram of an example computer device 300 is shown. In some embodiments, the computer device 300 may be exemplary of the computer device 240 (FIG. 2), the first server computer system 120 and/or the second server computer system 130.

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are non-transitory computer-readable storage mediums. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
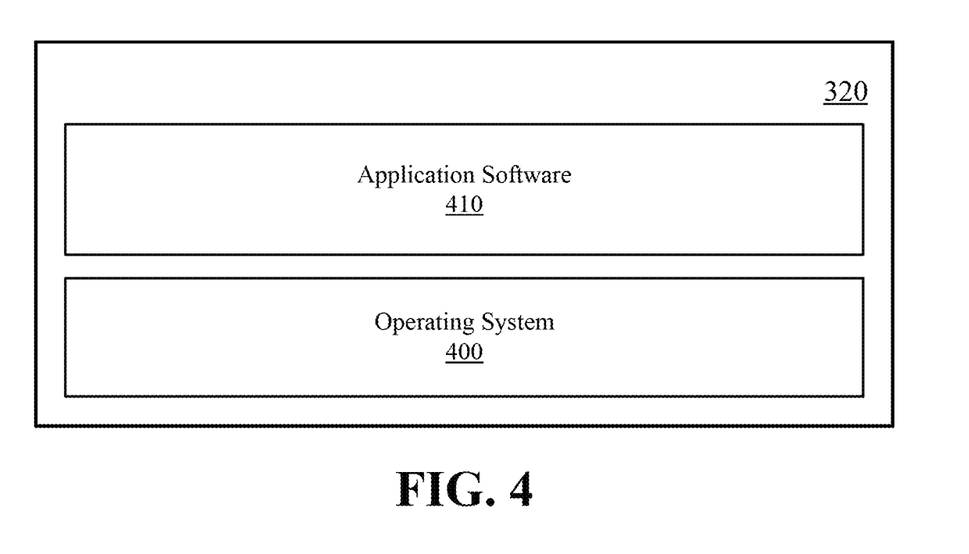
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computer device 240 (FIG. 2), the first server computer system 120 and/or the second server computer system 130.

While a single application 410 is illustrated in FIG. 4, in operation the memory 320 may include more than one application 410 and different applications 410 may perform different operations. For example, in at least some embodiments in which the computer device 300 is functioning as the requesting device 110, the applications 410 may include an application used to schedule access to a node class of a shared resource. The application may be configured for secure communications with the first server computer system 120 and/or second server computer system 130. For example, the application may allow a requesting party operating the requesting device to schedule access to a node class of a shared resource provided by the second server computer system 130. An indication of scheduled access to the node class of the shared resource may be communicated to the first server computer system 120 and stored in a database maintained thereby.

As mentioned, the second server computer system 130 may be associated with a provider of a shared resource. The shared resource may include different node classes. Each node class may include a number of nodes. Access may be scheduled to a particular node class of the shared resource.

In one or more embodiments, the shared resource may include a computing resource such as for example processors. A first node class may include a first type of processor and a second node class may include a second type of processor. The first type of processor may have a first processing speed and the second type of processor may have a second processing speed. As such, the second node class may be an upgrade from the first node class. Each node within the first node class may include a portion of the first type of processor or may include an entire first type of processor and each node within the second node class may include a portion of a second type of processor or may include an entire second type of processor.

In one or more embodiments, the shared resource may include electric vehicle (EV) charging. A first node class may include a first level of EV charging and a second node class may include a second level of EV charging. The first level of EV charging may be 120 V level 1 charging and the second level of EV charging may be DC fast charging. As such, the second node class may be an upgrade from the first node class. Each node within the first node class may include a particular connector used to charge an EV using the first level of EV charging and each node within the second node class may include a particular connector used to charge an EV using the second level of EV charging. As such, the second node class may be an upgrade from the first node class.

In one or more embodiments, the shared resource may include hotel rooms. A first node class may include a first type of hotel room and a second node class may include a second type of hotel room. The first type of hotel room may be a standard room and the second type of hotel room may be an upgraded room such as for example a suite. As such, the second node class may be an upgrade from the first node class. Each node within the first node class may include a particular hotel room of the first type and each node within the second node class may include a particular hotel room of the second type. IN another example, the first node class may include a first type of hotel room and a second node class may include the same first type of hotel room but with an additional upgrade such as for example a welcome gift (champagne, wine, etc.).

In one or more embodiments, the shared resource may include airline seats. A first node class may include a first type of airline seat and a second node class may include a second type of airline seat. The first type of airline seat may be within an economy cabin and the second type of airline seat may be within a first-class cabin. As such, the second node class may be an upgrade from the first node class. Each node within the first node class may include a particular seat within the economy cabin and each node within the second node class may include a particular seat within the first-class cabin.

Figure 5:
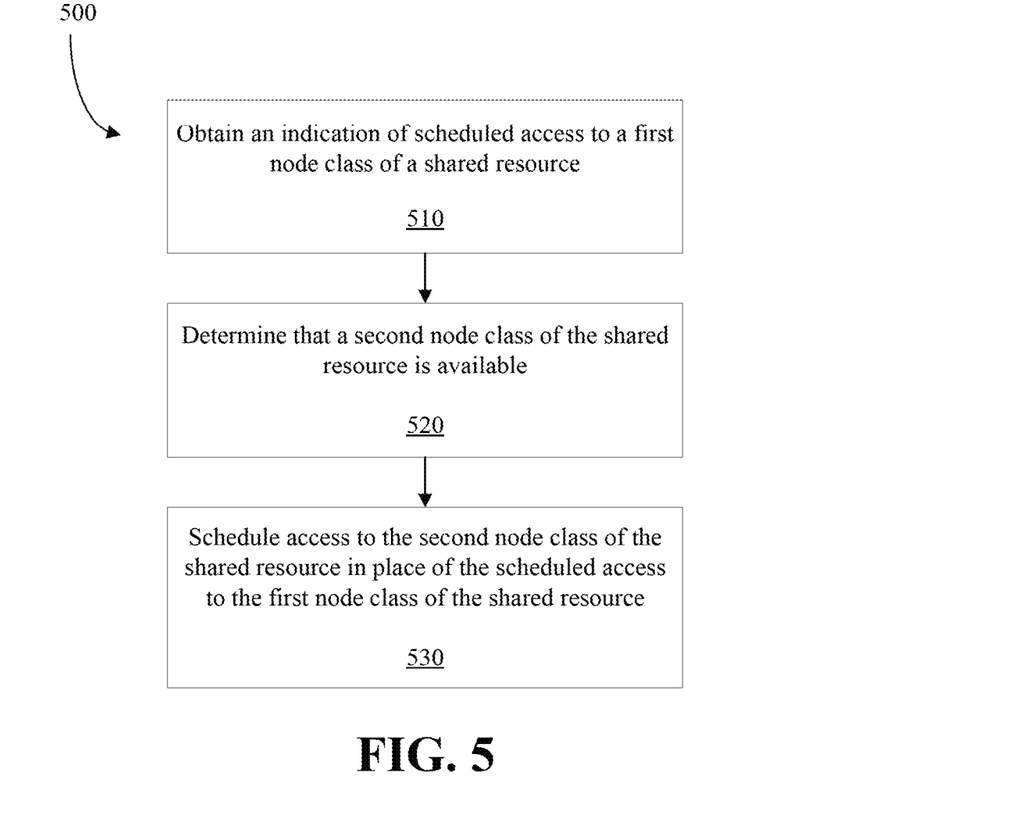
FIG. 5 is a flowchart showing operations performed by a server in scheduling access to a node class of a shared resource according to an embodiment.

As mentioned, the second server computer system 130 provides access to a node of a shared resource. FIG. 5 is a flowchart showing operations performed in scheduling access to node class of a shared resource according to an embodiment. The operations may be included in a method 500 which may be performed by the first server computer system 120. For example, computer-executable instructions stored in memory of the first server computer system 120 may, when executed by one or more processors, configure the first server computer system 120 to perform the method 500 or a portion thereof. The first server computer system 120 may offload some of the operations to the requesting device 110 and/or the second server computer system 130.

The method 500 includes obtaining an indication of scheduled access to a first node class of a shared resource (step 510).

As mentioned, once access to a first node class of a shared resource is scheduled, an indication of scheduled access to the node class of the shared resource may be communicated to the first server computer system 120 and stored in a database. As such, in one or more embodiments, the indication of scheduled access to the first node class of the shared resource may be obtained from the database.

In one or more embodiments, the first server computer system 120 may maintain a database that stores transaction data. In this embodiment, the first server computer system 120 may analyze transaction data to identify one or more transactions that may be associated with scheduling access to a node class of a shared resource. For example, the transaction data may identify a particular provider of a shared resource such as for example a hotel, an airline, an online booking service, etc. As such, the first server computer system 120 may obtain the indication of scheduled access to a first node class of a shared resource by analyzing the transaction data.

In one or more embodiments, the scheduled access to the first node class of the shared resource may include a time window. The time window may be, for example, a time window indicating when the access to the first node class of the shared resource is to be provided.

The method 500 includes determining that a second node class of the shared resource is available (step 520).

In one or more embodiments, determining that the second node class of the shared resource is available may include determining whether or not the provider of the shared resource has different node classes such as for example a first node class and a second node class and this may be based on, for example, historical data. For example, the first server computer system 120 may maintain data records based on previously scheduled access to the shared resource offered by the provider. As another example, the first server computer system 120 may send a signal to the second server computer system 130 that includes a request to confirm that the provider of the shared resource has different node classes.

As mentioned, in one or more embodiments, the scheduled access to the first node class may identify a time window. As such, determining that the second node class of the shared resource is available may include determining that a node within the second node class is available within the time window.

In one or more embodiments, determining that the second node class of the shared resource is available may include identifying, based on a load of the shared resource, that the second node class of the shared resource is available within the time window.

The load may be based on, for example, load data. The load data may identify, for the second node class, a number of total nodes, a number of nodes that do not have available bandwidth and a number of nodes that do have available bandwidth. The load data may additionally include a time duration for when bandwidth of a particular node is available.

In this example, the first server computer system 120 and/or the second server computer system 130 may obtain the load data from memory and may analyze the load data to identify that a node of the second node class is available within the time window.

In one or more embodiments, the first server computer system 120 and/or the second server computer system 130 may engage an artificial intelligence component to generate a load projection of the second node class of the shared resource. In this embodiment, the artificial intelligence component may be trained to generate the load projection of the shared resource based at least on historical load data.

In at least some embodiments, it may be determined that the second node class of the shared resource is not available and as such the first server computer system 120 may not perform any additional operations and as such the scheduled access to the first node class of the shared resource may be unchanged.

In one or more embodiments, when determining that the second node class of the shared resource is available, the first server computer system 120 may consult a database to determine that the second node class is to be scheduled in place of the first node class.

As another example, the database may include identifying information of a requesting party that scheduled the access to the first node class of the shared resource. The first server computer system 120 may determine, based on the identifying information of the requesting party, that the second node class it to be scheduled.

In one or more embodiments, the identifying information may identify a particular software application that has scheduled access to the first node class of the shared resource. The first server computer system 120 may identify that the particular software application requires certain security features for any computing resources that are to be used for executing the particular software application and as such may determine that only the first node class may be used to executed the particular software application and as such the first server computer system 120 may determine that the second node class is not to be scheduled in place of the first node class.

In one or more embodiments, the identifying information of the requesting party may identify a special date such as for example a birthdate, an anniversary date, a wedding date, etc. of the requesting party. The first server computer system 120 may identify that the time window of the scheduled access to the first node class overlaps with the special date and in response the first server computer system 120 may determine that the second node class is to be scheduled.

The method 500 includes scheduling access to the second node class of the shared resource in place of the scheduled access to the first node class of the shared resource (step 530).

As mentioned, the second server computer system 130 may be associated with a provider of the shared resource. As such, in one or more embodiments, scheduling access to the second node class of the shared resource in place of the scheduled access to the first node class of the shared resource may include sending, to the second server computer system 130, a request to schedule the access to the second node class. The request may include an identifier of the scheduled access to the first node class of the shared resource and the identifier may be obtained from, for example, the indication of the scheduled access to the first node class of the shared resource.

In one or more embodiments, the request to schedule the access to the second node class may be sent to the second server computer system 130 without notifying the requesting party that scheduled the access to the first node class of the shared resource. Put another way, the requesting party may be unaware that access to the second node class of the shared resource has been scheduled in place of the scheduled access to the first node class of the shared resource.

In one or more embodiments, the request to schedule the access to the second node class may include a binary flag indicating that the second node class is to be scheduled in place of the first node class. For example, the first server computer system 120 may obtain the indication of the scheduled access to the first node class of the shared resource, determine that the second node class of the shared resource is available, and may send a binary flag with a value of "1" indicating that access to the second node class of the shared resource is to be scheduled in place of the first node class of the shared resource.

In one or more embodiments, the first server computer system 120 may engage an application programming interface (API) associated with a provider of the shared resource to schedule the access to the second node class.

In one or more embodiments, the first server computer system 120 may send, to the second server computer system 130, a request to schedule access to the second node class of the shared resource in place of the scheduled access to the first node class only if a node of the second node class is available. In this example, the second server computer system 130 may perform operations to determine that the second node class of the shared resource is available and may schedule access to the second node class of the shared resource only when it is determined that the second node class of the shared resource is available.

Once access to the second node class of the shared resource has been scheduled in place of the scheduled access to the first node class of the shared resource, the first server computer system 120 and/or the second server computer system 130 may perform operations to provide access to a node of the second node class. For example, as mentioned, the scheduled access may identify a time window. As such, the first server computer system 120 and/or the second server computer system 130 may determine that a current time has reached the time window and may provide access to the node of the second node class. In one or more embodiments, providing access to the node of the second node class may include, for example, connecting the node to a device such as for example the requesting device.

As mentioned, in one or more embodiments, the request to schedule the access to the second node class may be sent to the second server computer system 130 without notifying the requesting party that scheduled the access to the first node class of the shared resource. Put another way, the requesting party may be unaware that access to the second node class of the shared resource has been scheduled in place of the scheduled access to the first node class of the shared resource. In these embodiments, the requesting party may only be aware that access to the second node class of the shared resource was scheduled once access has been provided.

In one or more embodiments, the shared resource may include a computing resource such as for example processors where a first node class may include a first type of processor and a second node class may include a second type of processor and where the second type or processor is an upgrade from the first type or processor. As such, the methods and systems described herein may obtain an indication of scheduled access to a first type of processor, may determine that a second type of processor is available, and may schedule access to the second type of processor in place of the scheduled access to the first type of processor. In this manner, access to an upgraded processor is scheduled.

In one or more embodiments, the shared resource may include electric vehicle (EV) charging where a first node class may include a first level of EV charging and a second node class may include a second level of EV charging and where the second level of EV charging is an upgrade from the first level of EV charging. As such, the methods and systems described herein may obtain an indication of scheduled access to a first level of EV charging, may determine that a second level of EV charging is available, and may schedule access to the second level of EV charging in place of the scheduled access to the first level of EV charging. In this manner, access to an upgraded level of EV charging is scheduled.

In one or more embodiments, the shared resource may include hotel rooms where a first node class may include a first type of hotel room and a second node class may include a second type of hotel room and where the second type of hotel room is an upgrade from the first type of hotel room. As such, the methods and systems described herein may obtain an indication of scheduled access to a first type of hotel room, may determine that a second type of hotel room is available, and may schedule access to the second type of hotel room in place of the scheduled access to the first type of hotel room. In this manner, access to an upgraded hotel room is scheduled.

In one or more embodiments, the shared resource may include airline seats where a first node class may include a first type of airline seat and a second node class may include a second type of airline seat and where the second type of airline seat is an upgrade from the first type of airline seat. As such, the methods and systems described herein may obtain an indication of scheduled access to a first type of airline seat, may determine that a second type of airline seat is available, and may schedule access to the second type of airline seat in place of the scheduled access to the first type of airline seat. In this manner, access to an upgraded airline seat is scheduled.

Although in embodiments described herein a shared resource is described as having a first node class and a second node class, it will be appreciated that the shared resource may have multiple node classes and an upgraded node class may be scheduled based on various criteria such as for example the bandwidth of a particular node class.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computer server system comprising:
a communications module;
a processor coupled with the communications module; and
a memory coupled to the processor and storing processor-executable instructions which, when executed by the processor, configure the processor to:
provide scheduled access to different node classes of a shared resource, where each node class includes a number of nodes;
obtain an indication of scheduled access to a first node class of the shared resource;
prior to providing the access to the first node class, determine that a second node class of the shared resource is available; and
schedule access to the second node class of the shared resource in place of the scheduled access to the first node class of the shared resource.

2. The server computer system of claim 1, wherein the scheduled access to the first node class identifies a time window and determining that the second node class is available includes determining that a node within the second node class is available within the time window.

3. The server computer system of claim 2, wherein the processor-executable instructions, when executed by the processor, further configure the processor to:
determine that a current time has reached the time window; and
provide access to the node within the second node class.

4. The server computer system of claim 1, wherein when scheduling access to the second node class, the processor-executable instructions, when executed by the processor, further configure the processor to:
send, via the communications module and to a third-party server associated with a provider of the shared resource, a request to schedule the access to the second node class.

5. The server computer system of claim 4, wherein the request to schedule the access to the second node class is sent to the third-party server without notifying a requesting party that scheduled the access to the first node class of the shared resource.

6. The server computer system of claim 4, wherein the request to schedule the access to the second node class includes a binary flag indicating that the second node class is to be scheduled in place of the first node class.

7. The server computer system of claim 1, wherein when scheduling access to the second node class, the processor-executable instructions, when executed by the processor, further configure the processor to:
engage an application programming interface associated with a provider of the shared resource to schedule the access to the second node class.

8. The server computer system of claim 1, wherein when determining that the second node class of the shared resource is available, the processor-executable instructions, when executed by the processor, further configure the processor to:
identify, based on a load projection for the shared resource, that the second node class of the shared resource is available.

9. The server computer system of claim 1, wherein the processor-executable instructions, when executed by the processor, further configure the processor to:
consult a database to determine that the second node class is to be scheduled in place of the first node class.

10. The server computer system of claim 1, wherein the second node class is an upgrade from the first node class.

11. A computer-implemented method comprising:
providing scheduled access to different node classes of a shared resource, where each node class includes a number of nodes;
obtaining an indication of scheduled access to a first node class of the shared resource;
prior to providing the access to the first node class, determining that a second node class of the shared resource is available; and
scheduling access to the second node class of the shared resource in place of the scheduled access to the first node class of the shared resource.

12. The method of claim 11, wherein the scheduled access to the first node class identifies a time window and determining that the second node class is available includes determining that a node within the second node class is available within the time window.

13. The method of claim 12, further comprising:
determining that a current time has reached the time window; and
providing access to the node within the second node class.

14. The method of claim 11, wherein when scheduling access to the second node class, the method further comprises:
sending, via a communications module and to a third-party server associated with a provider of the shared resource, a request to schedule the access to the second node class.

15. The method of claim 14, wherein the request to schedule the access to the second node class is sent to the third-party server without notifying a requesting party that scheduled the access to the first node class of the shared resource.

16. The method of claim 14, wherein the request to schedule the access to the second node class includes a binary flag indicating that the second node class is to be scheduled in place of the first node class.

17. The method of claim 11, wherein when scheduling access to the second node class, the method further comprises:
engaging an application programming interface associated with a provider of the shared resource to schedule the access to the second node class.

18. The method of claim 11, wherein when determining that the second node class of the shared resource is available, the method further comprises:
identifying, based on a load projection for the shared resource, that the second node class of the shared resource is available.

19. The method of claim 11, wherein the second node class is an upgrade from the first node class.

20. A non-transitory computer readable storage medium comprising computer-executable instructions which, when executed, configure a processor to:
provide scheduled access to different node classes of a shared resource, where each node class includes a number of nodes;
obtain an indication of scheduled access to first node class of the shared resource;
prior to providing the access to the first node class, determine that a second node class of the shared resource is available; and
schedule access to the second node class of the shared resource in place of the scheduled access to the first node class of the shared resource.

* * * * *